United States Patent
Thornton et al.

(10) Patent No.: US 10,830,509 B2
(45) Date of Patent: Nov. 10, 2020

(54) REFRIGERANT COOLING FOR VARIABLE SPEED DRIVE

(71) Applicant: DANFOSS A/S, Nordborg (DK)

(72) Inventors: William Turner Thornton, Winter Haven, FL (US); Mogens Rasmussen, Tallahassee, FL (US); Lin Sun, Tallahassee, FL (US)

(73) Assignee: DANFOSS A/S (DK)

( * ) Notice: Subject to any disclaimer, the term of this patent is extended or adjusted under 35 U.S.C. 154(b) by 431 days.

(21) Appl. No.: 15/322,698

(22) PCT Filed: Jul. 3, 2014

(86) PCT No.: PCT/US2014/045388
§ 371 (c)(1),
(2) Date: Dec. 28, 2016

(87) PCT Pub. No.: WO2016/003467
PCT Pub. Date: Jan. 7, 2016

(65) Prior Publication Data
US 2017/0131006 A1    May 11, 2017

(51) Int. Cl.
*F25B 31/00* (2006.01)
*F25B 1/10* (2006.01)
(Continued)

(52) U.S. Cl.
CPC .............. *F25B 31/006* (2013.01); *F25B 1/10* (2013.01); *F25B 5/02* (2013.01); *F25B 49/02* (2013.01);
(Continued)

(58) Field of Classification Search
CPC .......... F25B 31/006; F25B 5/02; F25B 49/02; F25B 2700/19; F25B 2700/21175; F25B 2600/0253
See application file for complete search history.

(56) References Cited

U.S. PATENT DOCUMENTS 5,651,260 A   7/1997  Goto
5,749,237 A   5/1998  Sandofsky et al.
(Continued)

FOREIGN PATENT DOCUMENTS

EP         2311674 A1 *  4/2011
JP         09210518 A     8/1997
(Continued)

OTHER PUBLICATIONS

Kobayashi et al., Refrigerator, Jun. 19, 1998, JPH10160315A, Whole Document.*

(Continued)

*Primary Examiner* — Larry L Furdge
(74) *Attorney, Agent, or Firm* — Carlson, Gaskey & Olds, P.C.

(57) ABSTRACT

An example refrigerant system according to an exemplary aspect of this disclosure includes, among other things, a refrigerant loop having at least a condenser, an evaporator, and a compressor. The compressor includes a motor in communication with a variable speed drive. The system further includes a cooling circuit including a pressure regulator downstream of a heat exchanger, the heat exchanger absorbing heat from the variable speed drive.

16 Claims, 4 Drawing Sheets

(51) Int. Cl.
  *F25B 5/02* (2006.01)
  *F25B 49/02* (2006.01)
  *F25B 1/053* (2006.01)

(52) U.S. Cl.
  CPC ....... *F25B 1/053* (2013.01); *F25B 2341/0662* (2013.01); *F25B 2400/05* (2013.01); *F25B 2600/0253* (2013.01); *F25B 2600/2513* (2013.01); *F25B 2600/2515* (2013.01); *F25B 2700/19* (2013.01); *F25B 2700/21153* (2013.01); *F25B 2700/21175* (2013.01); *Y02B 30/70* (2013.01)

(56) References Cited

U.S. PATENT DOCUMENTS

| | | | |
|---|---|---|---|
| 6,434,960 B1* | 8/2002 | Rousseau | F25B 1/047 62/228.4 |
| 6,874,329 B2 | 4/2005 | Stark | |
| 7,946,123 B2 | 5/2011 | Tolbert, Jr. et al. | |
| 8,650,894 B2 | 2/2014 | Tolbert, Jr. | |
| 2006/0225444 A1 | 10/2006 | Taras et al. | |
| 2007/0151269 A1 | 7/2007 | Crane et al. | |
| 2012/0262881 A1* | 10/2012 | Onimaru | B60L 3/003 361/701 |
| 2013/0255292 A1 | 10/2013 | Voorhis | |
| 2014/0013782 A1 | 1/2014 | Kopko et al. | |

FOREIGN PATENT DOCUMENTS

| | | |
|---|---|---|
| JP | H10160315 A * | 6/1998 |
| JP | 2006170469 A | 6/2006 |
| JP | 201014340 A | 1/2010 |
| JP | 2011153858 A | 8/2011 |
| WO | 2011077720 A | 5/2013 |
| WO | 2014082177 A1 | 6/2014 |

OTHER PUBLICATIONS

Montanari, Motor Compressor Assembly . . . , Apr. 20, 2011, EP2311674, Whole Document.*
Extended European Search Report for European Patent Application No. 14896917.3 completed Dec. 1, 2017.

\* cited by examiner

REFRIGERANT COOLING FOR VARIABLE SPEED DRIVE

BACKGROUND

Refrigerant compressors are used to circulate refrigerant to a chiller via a refrigerant loop. Prior refrigerant compressors have included impellers mounted on a shaft, which is driven by a motor at a fixed speed. These prior compressors have used mechanisms, such as inlet guide vanes and variable geometry diffusers, to adjust compressor capacity.

More recently, refrigerant compressors have adjusted capacity by alternatively or additionally including a variable speed drive (VSD) to vary the speed of the motor during operation. During operation of the compressor, the VSD generates heat, which may damage the electrical components within the VSD.

SUMMARY

An example refrigerant system according to an exemplary aspect of this disclosure includes, among other things, a refrigerant loop having at least a condenser, an evaporator, and a compressor. The compressor includes a motor in communication with a variable speed drive. The system further includes a cooling circuit including a pressure regulator downstream of a heat exchanger, the heat exchanger absorbing heat from the variable speed drive.

In a further embodiment of the foregoing system, a temperature sensor is mounted to the variable speed drive. The temperature sensor is configured to produce an output indicative of the temperature of the variable speed drive. Further, a controller is configured to receive the output from the temperature sensor, and to command an adjustment of the pressure regulator based on the output from the temperature sensor.

In a further embodiment of the foregoing system, the controller commands an adjustment of the pressure regulator when the output from the temperature sensor indicates that the temperature of the variable speed drive has deviated from a target temperature.

In a further embodiment of the foregoing system, the target temperature is predetermined.

In a further embodiment of the foregoing system, the cooling circuit includes an expansion valve upstream of the heat exchanger.

In a further embodiment of the foregoing system, a temperature sensor is downstream of the heat exchanger. The temperature sensor is configured to produce an output indicative of the temperature of the refrigerant within the cooling circuit at a location downstream of the heat exchanger. Further, a pressure sensor is downstream of the heat exchanger. The pressure sensor is configured to produce an output indicative of the pressure of the refrigerant within the cooling circuit at a location downstream of the heat exchanger. Also, a controller is configured to receive the outputs from the temperature and pressure sensors, and to command an adjustment of the expansion valve based on the outputs from the temperature and pressure sensors.

In a further embodiment of the foregoing system, the temperature and pressure sensors are positioned upstream of the pressure regulator.

In a further embodiment of the foregoing system, the temperature and pressure sensors are positioned downstream of the pressure regulator.

In a further embodiment of the foregoing system, the controller determines a level of superheat within the refrigerant downstream of the heat exchanger based on the outputs from the temperature and pressure sensors.

In a further embodiment of the foregoing system, the controller commands an adjustment of the expansion valve when the determined level of superheat deviates from a target superheat.

In a further embodiment of the foregoing system, the target superheat is predetermined.

In a further embodiment of the foregoing system, a source of refrigerant is provided to the cooling circuit from the condenser.

In a further embodiment of the foregoing system, refrigerant within the cooling circuit flows from the pressure regulator to the evaporator.

In a further embodiment of the foregoing system, a fan is configured to blow air onto the variable speed drive during operation of the compressor.

A method for cooling a variable speed drive for a compressor according to another exemplary aspect of this disclosure includes, among other things, establishing a flow of refrigerant within a heat exchanger mounted to a variable speed drive, sensing a first temperature of the variable speed drive during operation of the compressor, and adjusting a pressure regulator downstream of the heat exchanger in response to the sensed first temperature.

In a further embodiment of the foregoing method, the pressure regulator is incrementally closed if the sensed first temperature is below a target temperature.

In a further embodiment of the foregoing method, a second temperature downstream of the heat exchanger is sensed, a pressure downstream of the heat exchanger is sensed, and an expansion valve upstream of the heat exchanger is adjusted in response to the sensed second temperature and the sensed pressure.

In a further embodiment of the foregoing method, the amount of superheat in the refrigerant downstream of the heat exchanger is determined based on the sensed second temperature and the sensed pressure, and the expansion valve is incrementally closed if the determined amount of superheat is below a target superheat amount.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
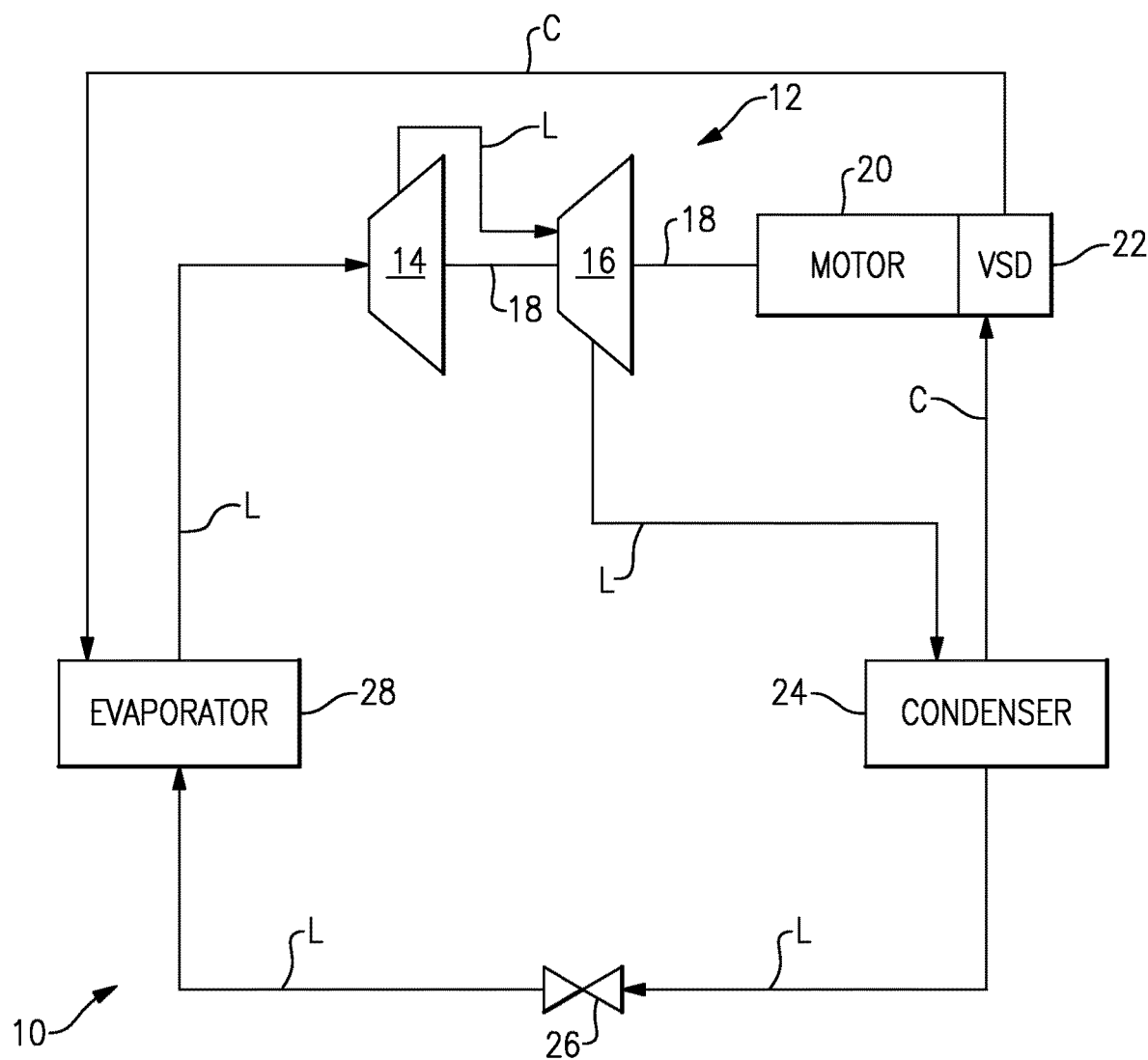
FIG. 1 schematically illustrates an example refrigerant system.

FIG. 1 schematically illustrates a refrigerant system 10. The system 10 includes a compressor 12 configured to pressurize a flow of refrigerant within a main refrigerant loop L. The compressor 12 in this example includes a first impeller 14 and a second impeller 16, each of which are mounted along a common shaft 18. The shaft 18 is driven by a motor 20. In this example, the motor 20 is in communication with a variable speed drive (VSD) 22.

VSDs are sometimes referred to as variable frequency drives. VSDs are known to include a main drive control assembly and a drive operator interface. The VSD 22 is configured to adjust a level of power delivered to the motor 20 and, thus vary the speed of rotation of the shaft 18.

In addition to the compressor 12, the main refrigerant loop L includes a condenser 24, an expansion valve 26 downstream of the condenser, and an evaporator 28 downstream of the expansion valve 26. The evaporator 28 is in fluid communication with the compressor 12.

The refrigerant system 10 further includes a cooling circuit C for cooling the VSD 22. The cooling circuit C, in one example, is provided with a source of refrigerant from the condenser 24. After cooling the VSD 22, the refrigerant flows downstream to the evaporator 28, where it is reintroduced into the main refrigerant loop L.

While the condenser 24 and evaporator 28 are mentioned as the source and return (respectively) of refrigerant for the cooling circuit C, other arrangements come within the scope of this disclosure. For instance, the cooling circuit C could be sourced from any location between (1) the outlet of the compressor 12 and (2) any point upstream of the expansion valve 24. Additionally, the cooling circuit C could return refrigerant to the main refrigerant loop L at a location between (1) any point downstream of the expansion valve 26 and (2) an interstage port of the compressor 12 (i.e., a port between the first and second impellers 14, 16).

Figure 2:
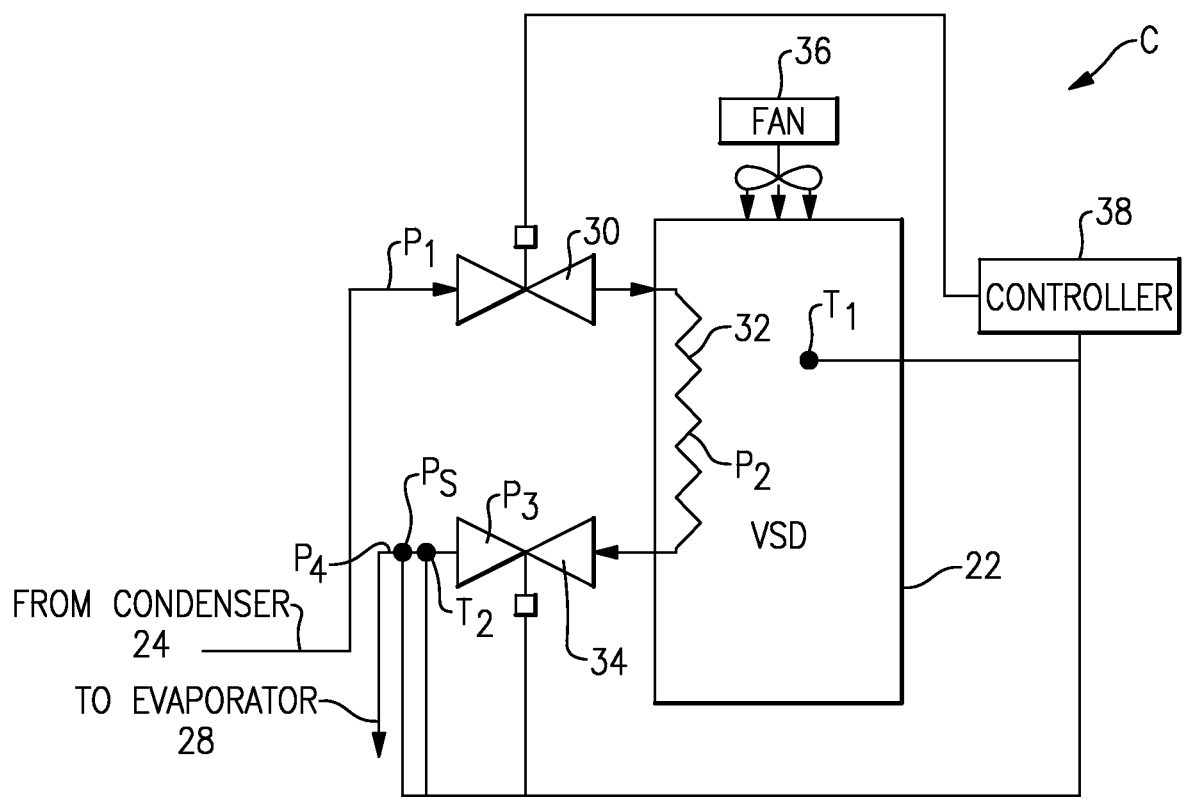
FIG. 2 schematically illustrates a cooling circuit for the variable speed drive (VSD) of FIG. 1.
Figure 3:
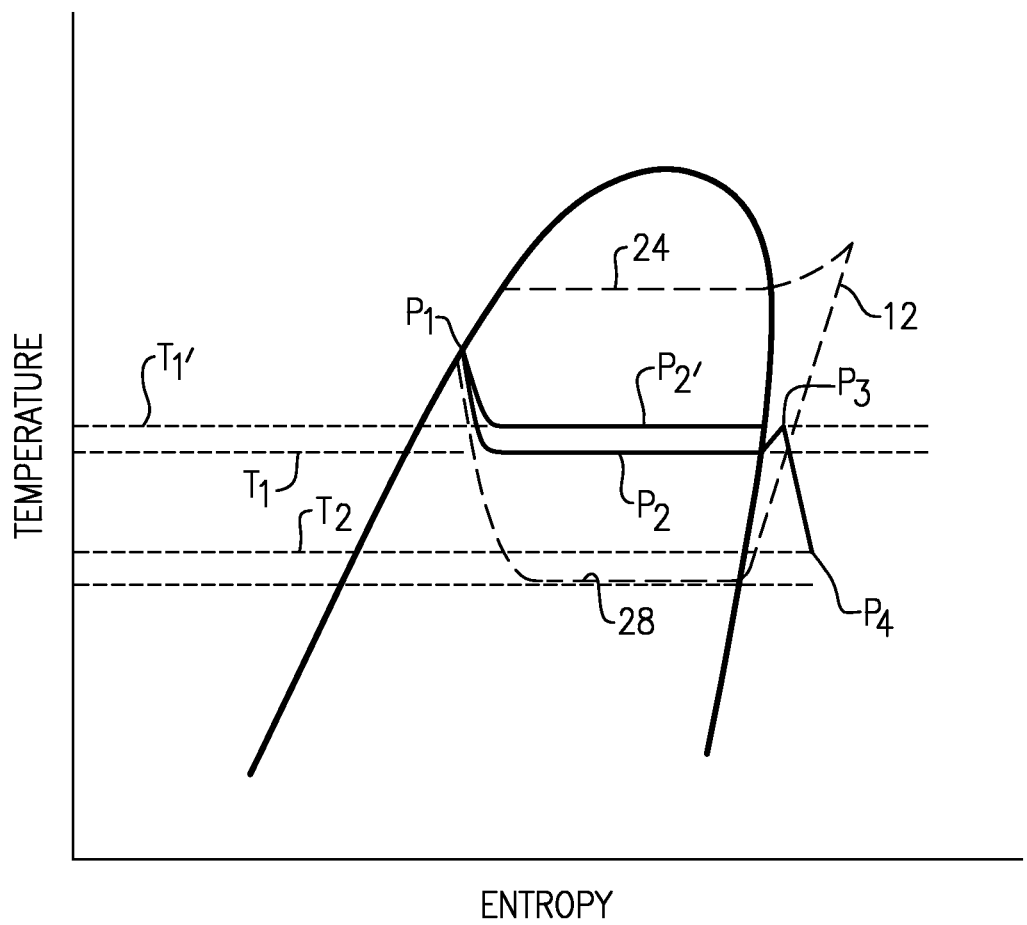
FIG. 3 is a plot of temperature versus entropy relative to the cooling circuit of FIG. 2.
Figure 4:
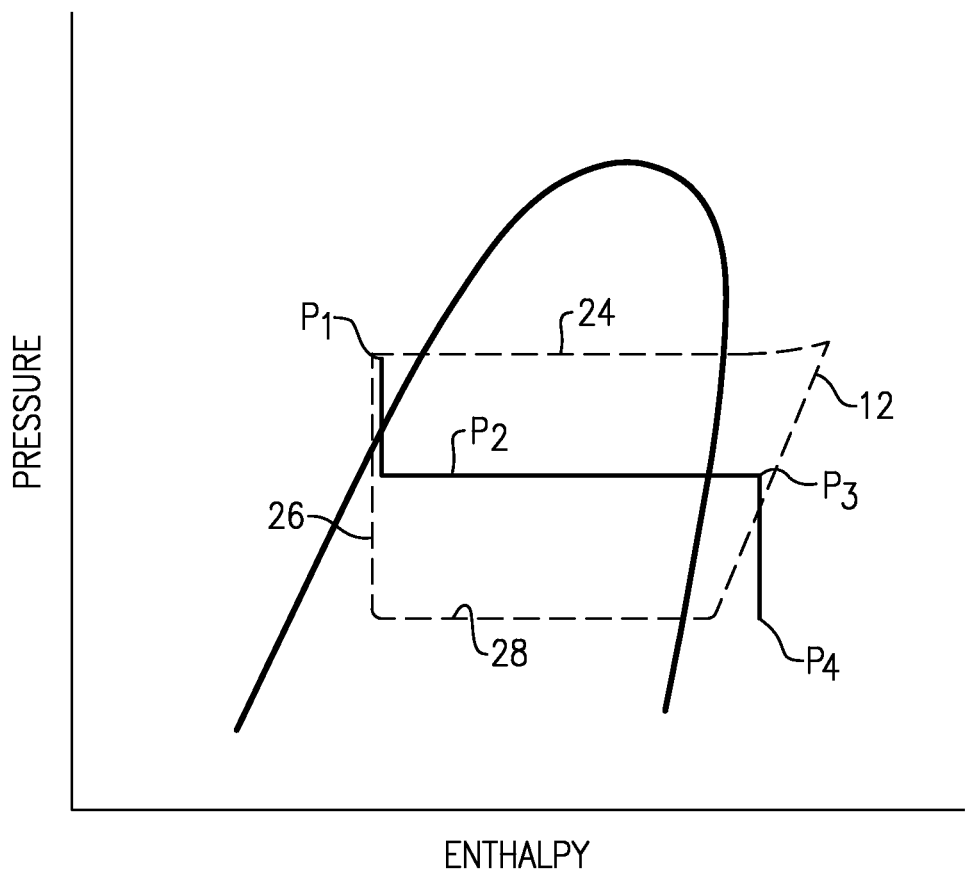
FIG. 4 is a plot of pressure versus enthalpy relative to the cooling circuit of FIG. 2.

The detail of one example cooling circuit C is illustrated in FIG. 2. The example cooling circuit C includes an expansion valve 30, a heat exchanger 32 downstream of the expansion valve 30, and a pressure regulator 34 downstream of the heat exchanger 32. In this example, the heat exchanger 32 is mounted to the VSD 22. In one example, the heat exchanger 32 may be a cold plate connected to a housing of the VSD 22. In addition to the heat exchanger 32, the VSD 22 may additionally be cooled by a fan 36, which is configured to blow relatively cool air on the VSD 22 during operation.

The expansion valve 30 and the pressure regulator 34 may be any type of device configured to regulate a flow of refrigerant, including mechanical valves, such as butterfly, gate or ball valves with electrical or pneumatic control (e.g., valves regulated by existing pressures). In the illustrated example, the control of the expansion valve 30 and pressure regulator 34 is regulated by a controller 38, which may be any known type of controller including memory, hardware, and software. The controller 38 is configured to store instructions, and to provide those instructions to the various components of the cooling circuit C, as will be discussed below.

With joint reference to FIGS. 1-4, during operation of the refrigerant system 10, in one example, refrigerant enters the cooling circuit C from the condenser 24. At $P_1$, the fluid is relatively high temperature, and in a liquid state. As fluid flows through the expansion valve 30, it becomes a mixture of vapor and liquid, at $P_2$.

The cooling circuit C provides an appropriate amount of refrigerant to the VSD 22 without forming condensation in the VSD 22. Condensation of water (i.e., water droplets) may form within the VSD 22 if the temperature of the VSD 22 falls below a certain temperature. This condensation may cause damage to the various electrical components within the VSD 22. The pressure regulator 34 is controlled to control the pressure of refrigerant within the heat exchanger 32, which in turn controls the temperature of that refrigerant, such that condensation does not form within the VSD 22. The expansion of refrigerant as it passes through the pressure regulator 34 is represented at $P_3$ in FIGS. 3-4. Further, if an appropriate amount of refrigerant is provided to the heat exchanger 32 by the expansion valve 30, the refrigerant will absorb heat from the VSD 22 and be turned entirely into a vapor downstream of the heat exchanger 32, at point $P_4$.

During operation of the refrigerant system 10, the temperature of the VSD 22 is continually monitored by a first temperature sensor $T_1$. In one example of this disclosure, the output of the first temperature sensor $T_1$ is reported to the controller 38. The controller 38 compares the output from the first temperature sensor $T_1$ to a target temperature $T_{TARGET}$. The target temperature $T_{TARGET}$ is representative of a temperature at which there will be no (or extremely minimal) condensation within the VSD 22. That is, $T_{TARGET}$ is above a temperature at which condensation is known to begin to form. In one example $T_{TARGET}$ is a predetermined value. In other examples, the controller 38 is configured to determine $T_{TARGET}$ based on outside temperature and humidity.

The controller 38 is further in communication with the pressure regulator 34, and is configured to command an adjustment of the pressure regulator 34 based on the output from the first temperature sensor $T_1$. The position of the pressure regulator 34 controls the temperature of the refrigerant within the heat exchanger 32. In general, during normal operation of the system 10, the controller 38 maintains the position of the pressure regulator 34 such that the output from $T_1$ is equal to $T_{TARGET}$. However, if the output from $T_1$ decreases and falls below $T_{TARGET}$, the controller 38 commands the pressure regulator 34 to incrementally close (e.g., by 5%). Conversely, if the output from $T_1$ increases, the controller 38 commands the pressure regulator 34 to incrementally open.

Incrementally closing the pressure regulator 34 raises the temperature of the refrigerant within the heat exchanger 32, and prevents condensation from forming within the VSD 22. In one example, the controller 38 commands adjustment of the pressure regulator 34 until the output from $T_1$ returns to $T_{TARGET}$. Closing the pressure regulator 34 raises the output from $T_1$ and raises the pressure $P_2$, as illustrated graphically in FIG. 3 at $T_{1'}$ and $P_{2'}$.

Concurrent with the control of the pressure regulator 34, the controller 38 also controls the expansion valve 30 during operation. In this example the temperature and pressure of the refrigerant within the cooling circuit C downstream of the heat exchanger 32 are determined by a second temperature sensor $T_2$ and a pressure sensor $P_S$. In one example, the temperature sensor $T_2$ and the pressure sensor $P_S$ are located downstream of the pressure regulator 34. However, $T_2$ and $P_S$ could be located downstream of the heat exchanger 32 and upstream of the pressure regulator 34.

The outputs from the second temperature sensor $T_2$ and the pressure sensor $P_S$ are reported to the controller 38. The controller 38 is configured to determine (e.g., by using a look-up table) a level of superheat within the refrigerant downstream of the heat exchanger (e.g., at $P_4$). The controller 38 then compares the level of superheat within the refrigerant at $P_4$ and a superheat target value $SH_{TARGET}$. This comparison indicates whether an appropriate level of fluid was provided to the heat exchanger 32 by the expansion valve 30.

For example, the output from the second temperature sensor $T_2$ is compared to a saturation temperature $T_{SAT}$ at the pressure sensor output from the pressure sensor $P_S$. From this comparison, the controller 38 determines the level of superheat in the refrigerant. In one example, the controller 38 maintains the position of the expansion valve 30 such that the level of superheat exhibited by the refrigerant equals $SH_{TARGET}$. If the level of superheat exhibited by the refrigerant falls below $SH_{TARGET}$, the controller 38 will determine that too much fluid is provided to the heat exchanger 32 and will incrementally close the expansion valve 30. Conversely, the controller 38 will command the expansion valve 32 to incrementally open if the level of superheat exhibited by the refrigerant exceeds $SH_{TARGET}$.

This disclosure references an "output" from a sensor in several instances. As is known in the art, sensor outputs are typically in the form of a change in some electrical signal (such as resistance or voltage), which is capable of being interpreted as a change in temperature or pressure, for example, by a controller (such as the controller 38). The disclosure extends to all types of temperature and pressure sensors.

Further, while a single controller 38 is illustrated, the expansion valve 30 and pressure regulator 34 could be in communication with separate controllers. Additionally, the cooling circuit C does not require a dedicated controller 38. The functions of the controller 38 described above could be performed by a controller having additional functions. Further, the example control logic discussed above is exemplary. For instance, whereas in some instances this disclosure references the term "equal" in the context of comparisons to $T_{TARGET}$ and $SH_{TARGET}$, the term "equal" is only used for purposes of illustration. In practice, there may be an acceptable (although relatively minor) variation in values that would still constitute "equal" for purposes of the control logic of this disclosure.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A refrigerant system, comprising:
   a refrigerant loop including at least a condenser, an evaporator, and a compressor, the compressor including a motor in communication with a variable speed drive;
   a cooling circuit including a pressure regulator downstream of a heat exchanger, wherein the heat exchanger is mounted to the variable speed drive and the heat exchanger is configured to absorb heat from the variable speed drive;
   a temperature sensor mounted to the variable speed drive, the temperature sensor configured to produce an output indicative of the temperature of the variable speed drive;
   a controller configured to receive the output from the temperature sensor, and to command an adjustment of the pressure regulator based on the output from the temperature sensor;
   wherein the controller commands an adjustment of the pressure regulator when the output from the temperature sensor indicates that the temperature of the variable speed drive has deviated from a target temperature.

2. The refrigerant system as recited in claim 1, wherein the target temperature is predetermined.

3. The refrigerant system as recited in claim 1, wherein the cooling circuit includes an expansion valve upstream of the heat exchanger.

4. A refrigerant system, comprising:
   a refrigerant loop including at least a condenser, an evaporator, and a compressor, the compressor including a motor in communication with a variable speed drive; and
   a cooling circuit including a pressure regulator downstream of a heat exchanger, the heat exchanger absorbing heat from the variable speed drive, the cooling circuit further including an expansion valve upstream of the heat exchanger;
   a temperature sensor downstream of the heat exchanger, the temperature sensor configured to produce an output indicative of the temperature of the refrigerant within the cooling circuit at a location downstream of the heat exchanger;
   a pressure sensor downstream of the heat exchanger, the pressure sensor configured to produce an output indicative of the pressure of the refrigerant within the cooling circuit at a location downstream of the heat exchanger; and
   a controller configured to receive the outputs from the temperature and pressure sensors, and to command an adjustment of the expansion valve based on the outputs from the temperature and pressure sensors.

5. The refrigerant system as recited in claim 4, wherein the temperature and pressure sensors are positioned upstream of the pressure regulator.

6. The refrigerant system as recited in claim 4, wherein the temperature and pressure sensors are positioned downstream of the pressure regulator.

7. The refrigerant system as recited in claim 4, wherein the controller determines a level of superheat within the refrigerant downstream of the heat exchanger based on the outputs from the temperature and pressure sensors.

8. The refrigerant system as recited in claim 7, wherein the controller commands an adjustment of the expansion valve when the determined level of superheat deviates from a target superheat.

9. The refrigerant system as recited in claim 8, wherein the target superheat is predetermined.

10. The refrigerant system as recited in claim 1, wherein a source of refrigerant is provided to the cooling circuit from the condenser.

11. The refrigerant system as recited in claim 1, wherein refrigerant within the cooling circuit flows from the pressure regulator to the evaporator.

12. The refrigerant system as recited in claim 1, further comprising:
    a fan configured to blow air onto the variable speed drive during operation of the compressor.

13. A method for cooling a variable speed drive for a compressor, comprising:
    establishing a flow of refrigerant within a heat exchanger mounted to a variable speed drive;
    sensing a first temperature of the variable speed drive during operation of the compressor; and
    adjusting a pressure regulator downstream of the heat exchanger in response to the sensed first temperature.

14. The method as recited in claim 13, wherein the pressure regulator is incrementally closed if the sensed first temperature is below a target temperature.

15. A method for cooling a variable speed drive for a compressor, comprising:
- establishing a flow of refrigerant within a heat exchanger mounted to a variable speed drive;
- sensing a first temperature of the variable speed drive during operation of the compressor;
- adjusting a pressure regulator downstream of the heat exchanger in response to the sensed first temperature;
- sensing a second temperature downstream of the heat exchanger;
- sensing a pressure downstream of the heat exchanger; and
- adjusting an expansion valve upstream of the heat exchanger in response to the sensed second temperature and the sensed pressure.

16. The method as recited in claim 15, further comprising: determining the amount of superheat in the refrigerant downstream of the heat exchanger based on the sensed second temperature and the sensed pressure, wherein the expansion valve is incrementally closed if the determined amount of superheat is below a target superheat amount.

\* \* \* \* \*